United States Patent
Morita et al.

(10) Patent No.: US 9,728,785 B2
(45) Date of Patent: Aug. 8, 2017

(54) ACTIVE MATERIAL FOR SODIUM ION BATTERY, AND SODIUM ION BATTERY

(71) Applicants: Toyota Jidosha Kabushiki Kaisha, Toyota-shi, Aichi-ken (JP); Osaka University, Suita-Shi, Osaka (JP)

(72) Inventors: Yasushi Morita, Nagoya (JP); Shinji Nakanishi, Mishima (JP)

(73) Assignees: Toyota Jidosha Kabushiki Kaisha, Toyota-shi (JP); Osaka University, Suita-shi (JP)

( * ) Notice: Subject to any disclaimer, the term of this patent is extended or adjusted under 35 U.S.C. 154(b) by 204 days.

(21) Appl. No.: 14/730,641

(22) Filed: Jun. 4, 2015

(65) Prior Publication Data
US 2015/0357645 A1    Dec. 10, 2015

(30) Foreign Application Priority Data
Jun. 5, 2014    (JP) .................................. 2014-116575

(51) Int. Cl.
*H01M 4/60*    (2006.01)
*H01M 10/054*    (2010.01)

(52) U.S. Cl.
CPC ............ *H01M 4/60* (2013.01); *H01M 10/054* (2013.01)

(58) Field of Classification Search
CPC .............................. H01M 4/60; H01M 10/054
USPC ........................................................ 429/213
See application file for complete search history.

(56) References Cited

U.S. PATENT DOCUMENTS

2013/0189571 A1*    7/2013    Abouimrane ........... H01M 4/60
                                                                     429/188

FOREIGN PATENT DOCUMENTS

| JP | 2007-227186 A | 9/2007 |
| JP | 2009-129742 A | 6/2009 |
| WO | 2013042706 A1 | 3/2013 |

* cited by examiner

*Primary Examiner* — Basia Ridley
*Assistant Examiner* — James Erwin
(74) *Attorney, Agent, or Firm* — Dinsmore & Shohl LLP

(57) ABSTRACT

Provided is an active material for a sodium ion battery including: (t-butyl)₃-trioxotriangulene shown below.

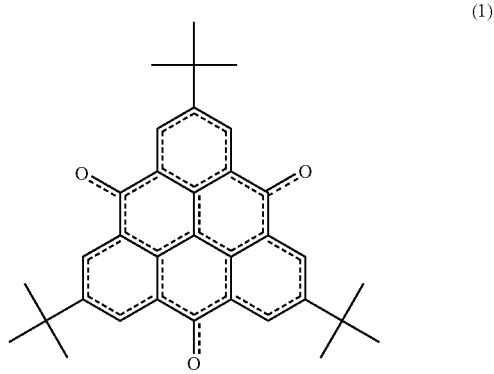

(1)

In Formula (1), a double line including a solid line and a broken line represents a single bond or a double bond.

3 Claims, 3 Drawing Sheets

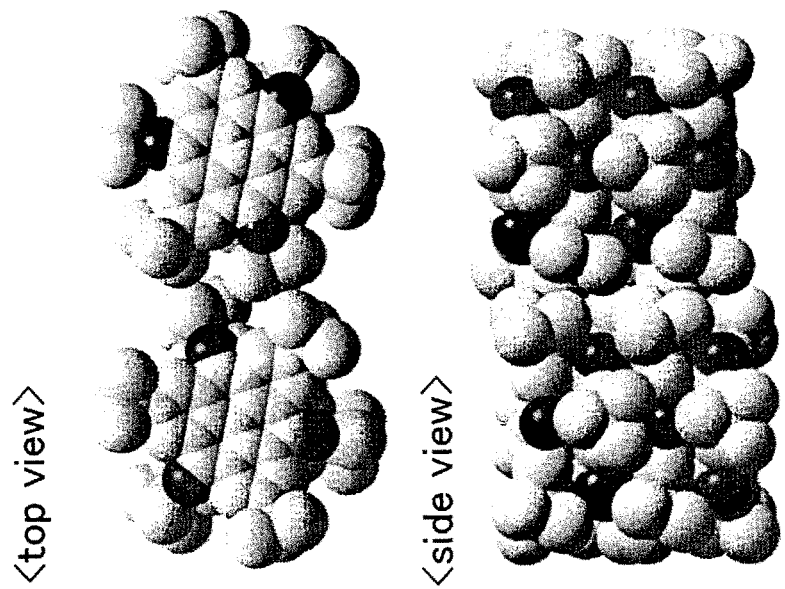
F I G. 1B
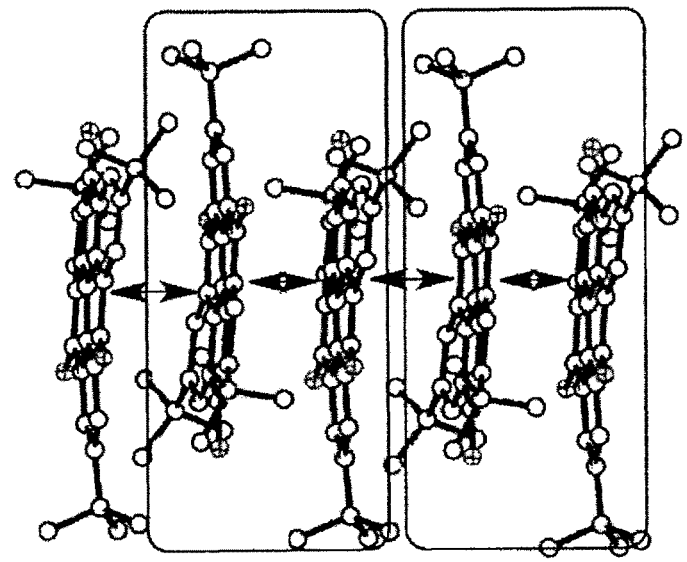
F I G. 1A

ACTIVE MATERIAL FOR SODIUM ION BATTERY, AND SODIUM ION BATTERY

INCORPORATION BY REFERENCE

The disclosure of Japanese Patent Application No. 2014-116575 filed on Jun. 5, 2014 including the specification, drawings and abstract is incorporated herein by reference in its entirety.

BACKGROUND OF THE INVENTION

1. Field of the Invention

The present invention relates to an active material for a high-capacity sodium ion battery.

2. Description of Related Art

Sodium ion batteries are batteries in which Na ions move between a positive electrode and a negative electrode. Since Na is more abundant than Li, sodium ion batteries have an advantageous effect in that the cost can be easily reduced as compared to lithium ion batteries. In general, a sodium ion battery includes: a positive electrode active material layer containing a positive electrode active material; a negative electrode active material layer containing a negative electrode active material; and an electrolyte layer formed between the positive electrode active material layer and the negative electrode active material layer.

The negative electrode active material used in the sodium ion battery has been actively studied. For example, International Publication WO 2013/042706 discloses an organic compound having a phenalenyl structure or a derivative thereof as an active material for a lithium ion battery. In addition, Japanese Patent Application Publication No. 2009-129742 (JP 2009-129742 A) describes that a cyclic compound is used as a negative electrode active material for a sodium ion secondary battery. Further, Japanese Patent Application Publication No. 2007-227186 (JP 2007-227186 A) discloses an organic compound having a phenalenyl structure as an active material not for a sodium ion battery but for a lithium ion battery.

International Publication WO 2013/042706 reports that Br3-trioxotriangulene or (t-butyl)$_3$-trioxotriangulene having a phenalenyl structure functions as an active material for a lithium ion battery. However, it is neither known nor reported that an organic compound having a phenalenyl structure or a derivative thereof functions as an active material for a sodium ion battery.

In addition, reported examples of the active material for a sodium ion battery are fewer than those of the active material for a lithium ion battery. Therefore, an active material for a sodium ion battery having a crucial characteristic has yet to be developed.

SUMMARY OF THE INVENTION

The invention provides an active material for a high-capacity sodium ion battery.

According to a first aspect of the invention, there is provided an active material for a sodium ion battery including: (t-butyl)$_3$-trioxotriangulene represented by the following Formula (1).

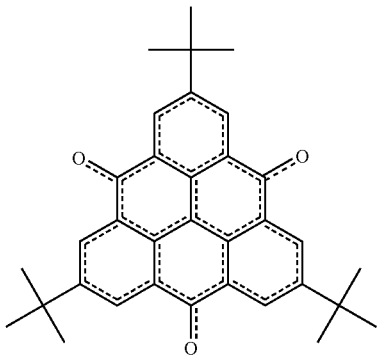

In Formula (1), a double line including a solid line and a broken line represents a single bond or a double bond.

According to the invention, by the active material for the sodium ion battery including (t-butyl)$_3$-trioxotriangulene, the capacity of the active material for the sodium ion battery can be made to be high.

The active material for the sodium ion battery may be a negative electrode active material.

According to a second aspect of the invention, there is provided a sodium ion battery including: a positive electrode active material layer containing a positive electrode active material; a negative electrode active material layer containing a negative electrode active material; and an electrolyte layer formed between the positive electrode active material layer and the negative electrode active material layer. The positive electrode active material or the negative electrode active material may be the above-described active material for the sodium ion battery.

According to the invention, by using the active material for the sodium ion battery, the capacity of the sodium ion battery can be made to be high.

The negative electrode active material may be the active material for the sodium ion battery.

According to the invention, an active material for a high-capacity sodium ion battery which functions as an active material for the sodium ion battery can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A is a schematic diagram showing an active material for a sodium ion battery according to an embodiment of the invention;

FIG. 1B is a schematic diagram showing an active material for a sodium ion battery according to an embodiment of the invention;

DETAILED DESCRIPTION OF EMBODIMENTS

Figure 2:
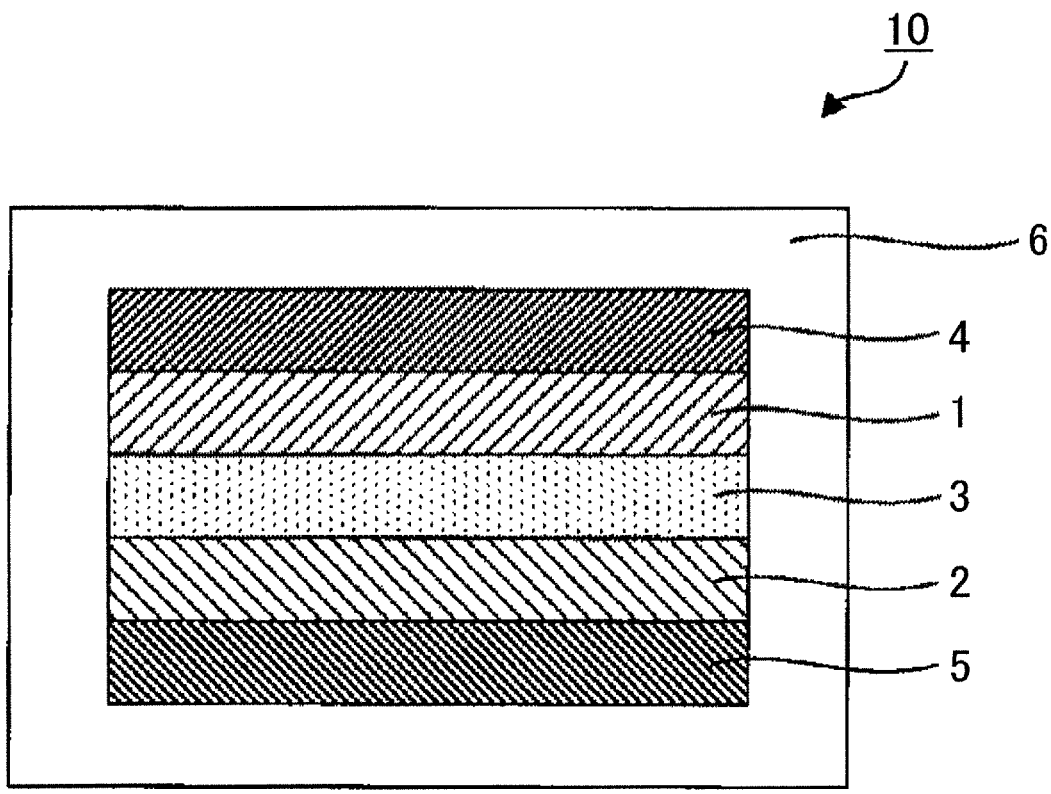
FIG. 2 is a schematic cross-sectional view showing an example of the sodium ion battery according to the embodiment of the invention.

Hereinafter, an active material for a sodium ion battery and a sodium ion battery according to an embodiment of the invention will be described in detail.

A. Active Material for Sodium Ion Battery

The active material for a sodium ion battery according to the embodiment of the invention includes (t-butyl)₃-trioxotriangulene represented by the following Formula (1).

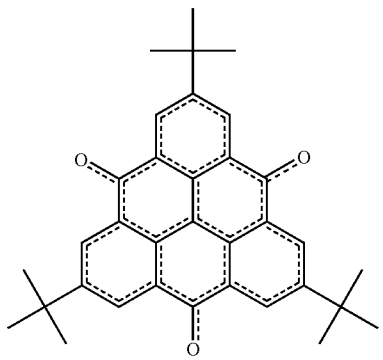

(1)

In Formula (1), a double line including a solid line and a broken line represents a single bond or a double bond.

Here, examples of "(t-butyl)₃-trioxotriangulene" represented by Formula (1) include a neutral radical compound represented by the following Formula (1-1), an anion compound represented by the following Formula (1-2), a radical dianion compound represented by the following Formula (1-3), a diradical trianion compound represented by the following Formula (1-4), and a radical tetraanion compound represented by the following Formula (1-5). Hereinafter, trioxotriangulene will also be simply abbreviated as "TOT".

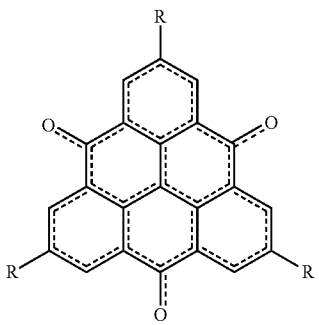

(2)

In Formula (2), a double line including a solid line and a broken line represents a single bond or a double bond.

TOT represented by Formula (2) has a structure in which three oxygen atoms are introduced into triangulene. In addition, triangulene has a structure in which six benzene rings are condensed on a plane. By TOT having such a structure, the number of electrons stored and released per molecule is improved, and a high discharge capacity can be obtained. Therefore, it is presumed that, since (t-butyl)₃-TOT is a TOT derivative containing TOT as a base material, the capacity of the active material for a sodium ion battery can be made to be high.

In addition, it is presumed that, since (t-butyl)₃-TOT according to the embodiment is a TOT derivative in which R in TOT represented by Formula (2) is t-butyl, high stability can be exhibited, and the capacity of the active material can be made to be high. The reason is presumed to

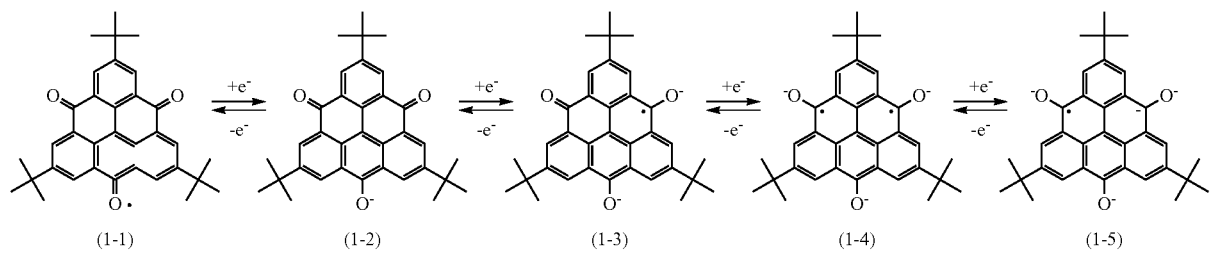

(1-1)  (1-2)  (1-3)  (1-4)  (1-5)

According to the embodiment of the invention, by the active material for a sodium ion battery including (t-butyl)₃-TOT, the capacity of the active material for a sodium ion battery can be made to be high. However, as described below, the reaction between (t-butyl)₃-TOT and sodium ions is a radical reaction occurring on the surface of (t-butyl)₃-TOT, but many points of a specific reaction mechanism thereof are not clear. Therefore, whether or not (t-butyl)₃-TOT functions as an active material for a sodium ion battery cannot be easily predicted. However, in the invention, it is clear that (t-butyl)₃-TOT functions as an active material for a sodium ion battery.

In addition, the reason why, by the active material for a sodium ion battery including (t-butyl)₃-TOT, the capacity of the active material for a sodium ion battery can be made to be high is presumed to be as follows. First, (t-butyl)₃-TOT is a TOT derivative in which R in TOT represented by the following Formula (2) is t-butyl.

be as follows. First, a group of neutral radical compounds such as TOT is generally known to have high stability. However, an oxidation-reduction reaction occurs between TOT and sodium ions, and thus TOT is converted into an anion compound. Accordingly, there is a problem in that the stability of TOT decreases. Specifically, TOT having a planar structure is stably present in a multi-layer state. However, when each TOT in the multi-layer state is reduced into an anion compound so as to have a negative charge, electron repulsion occurs between the TOT layers, and the multi-layer state is collapsed. As a result, there is a problem in that the stability decreases. In addition, when R in TOT represented by Formula (2) is halogen such as Br or Cl, the above-described problem is significant. One of the reasons is presumed to be that halogen has electron attracting properties. On the other hand, in (t-butyl)₃-TOT according to the embodiment of the invention, R in TOT represented by Formula (2) is t-butyl having a bulky three-dimensional structure. Therefore, as shown in FIGS. 1A and 1B, (t-butyl)$_3$-TOT is in a multi-layer state. Even when (t-butyl)$_3$-TOT is converted into an anion compound having a negative charge due to the oxidation-reduction reaction with sodium ions, a predetermined distance can be maintained between the (t-butyl)$_3$-TOT layers. Electron repulsion between the (t-butyl)$_3$-TOT layers can be suppressed, and the multi-layer state can be maintained. That is, by using (t-butyl)$_3$-TOT in which R in TOT represented by Formula (2) is t-butyl, the stability can be maintained. In addition, since t-butyl has electron donating properties, the above-described effect is significant. Therefore, it is presumed that (t-butyl)$_3$-TOT according to the embodiment can exhibit high stability, and the capacity of the active material for a sodium ion battery can be made to be high. Typically, (t-butyl)$_3$-TOT is present in a black hexagonal columnar crystal state.

Further, in the embodiment of the invention, by using (t-butyl)$_3$-TOT as an active material, the elution of the active material to an electrolyte layer can be suppressed. Therefore, it is presumed that the capacity of the active material for a sodium ion battery can be made to be high. Specifically, (t-butyl)$_3$-TOT is a compound that is particularly hardly decomposed even in an organic neutral radical compound and forms a strong intermolecular network in a crystal state. Therefore, it is presumed that the elution of (t-butyl)$_3$-TOT to an electrolyte layer caused by repeatedly charging and discharging a sodium ion battery can be suppressed, and a decrease in capacity can be efficiently suppressed.

In addition to the above-described effects, according to the embodiment of the invention, by the active material for a sodium ion battery including (t-butyl)$_3$-TOT, the safety of a battery can be improved. In the related art, it is known that hard carbon is used as a negative electrode active material for a sodium ion battery. However, hard carbon has a low action potential as an active material and thus has a problem in that Na metal is likely to be deposited. Na metal has extremely high reactivity, and thus when Na metal is deposited, the safety of a battery decreases. On the other hand, (t-butyl)$_3$-TOT according to the embodiment of the invention can operate at a sufficiently higher potential than a potential at which Na metal is deposited. Therefore, by using the active material for a sodium ion battery including (t-butyl)$_3$-TOT as a negative electrode active material, the safety of a battery can be improved.

In addition, according to the embodiment of the invention, by the active material for a sodium ion battery including (t-butyl)$_3$-TOT, a high-output battery can be obtained. In the related art, it is known that, for example, titanium oxide is used as an active material for a sodium ion battery. Titanium oxide operates at a potential around 1 V, and when used as an active material, can suppress the deposition of Na metal. However, when titanium oxide is used as an active material, the storing/releasing reaction of sodium ions is extremely delayed, and there is a problem in that it is difficult to obtain a high-output battery. The reason is presumed to be that the storing/releasing reaction of sodium ions occurs in a structure of titanium oxide. On the other hand, when (t-butyl)$_3$-TOT is used as an active material as in the embodiment, the storing/releasing reaction of sodium ions is a radical reaction that occurs on a surface of (t-butyl)$_3$-TOT. Therefore, in the embodiment, the reaction rate is extremely higher than that of a storing/releasing reaction that occurs between an active material of the related art and sodium ions. As a result, a high-output battery can be obtained.

Figure 3:
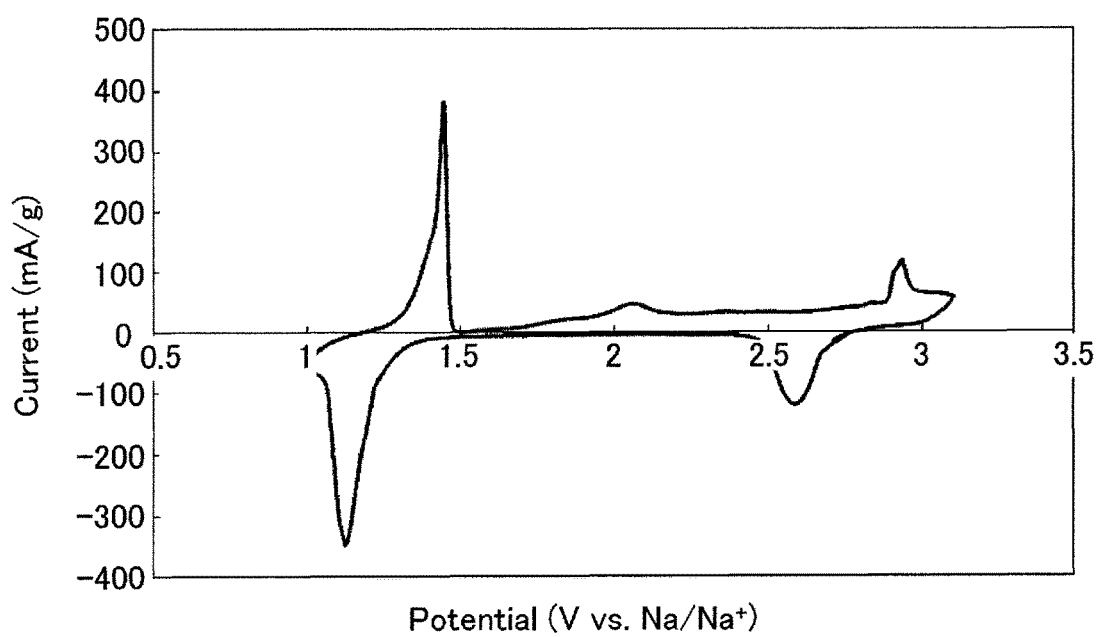
FIG. 3 is a graph showing the results of CV measurement of the sodium ion battery according to the embodiment of the invention.

The active material for a sodium ion battery according to the embodiment of the invention is useful as a positive electrode active material or a negative electrode active material for a sodium ion battery. This point is clarified from the following fact that, for example, when cyclic voltammetry (CV measurement) is performed using a sodium ion battery containing (t-butyl)$_3$-TOT as an active material, as shown in FIG. 3 described below, an oxidation-reduction current is observed in a region of 1.0 V to 1.5 V (vs. Na electrode potential) where the active material can be used for a negative electrode and in a region of 2.5 V to 3.1 V (vs. Na electrode potential) where the active material can be used for a positive electrode. In addition, it is more preferable that the active material for a sodium ion battery according to the embodiment is used as a negative electrode active material because the aptitude as a negative electrode active material is higher than the aptitude as a positive electrode active material. For example, the reason is as follows. As shown in FIG. 3 described below, the reaction current in the region of 1.0 V to 1.5 V (vs. Na electrode potential) is higher than that in the region of 2.5 V to 3.1 V (vs. Na electrode potential). Further, a difference between an oxidation current peak potential and a reduction current peak potential in the region of 1.0 V to 1.5 V is less than that in the region of 2.5 V to 3.1 V. Therefore, the reaction rate in the region of 1.0 V to 1.5 V is higher than that in the region of 2.5 V to 3.1 V.

A shape of the active material for a sodium ion battery according to the embodiment of the invention is preferably particulate. In addition, the average particle size ($D_{50}$) of the active material for a sodium ion battery is, for example, preferably in a range of 1 nm to 100 μm and more preferably in a range of 10 nm to 30 μm.

A synthesis method of the active material for a sodium ion battery according to the embodiment of the invention is not particularly limited as long as the above-described active material can be obtained using the method. For example, a method of synthesizing a neutral radical compound of (t-butyl)$_3$-TOT represented by the following Formula (1-1) is as follows.

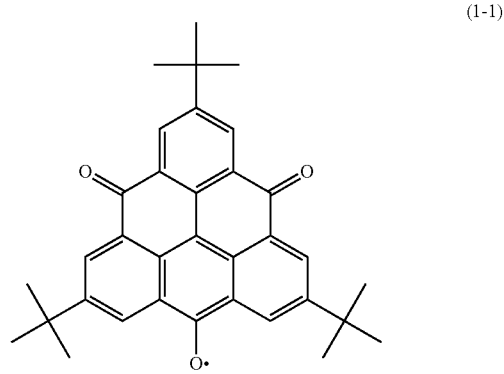

(1-1)

That is, first, 563 mg (1.06 mmol) of potassium 2,6,10-tri-t-butyl-4,8-dioxo-4H,8H-dibenzo[cd,mn]pyrene-12-olate is put into a 20 mL flask and is suspended in 20 mL of 2 mol/L hydrochloric acid. Next, the suspension is stirred in a water bath at 60° C. for 5 hours to cause a reaction. After completion of the reaction, the solution is cooled to room temperature, and a crude product is washed with 2 mol/L of hydrochloric acid and then is separated by filtration. Next, the crude product is dried in a vacuum at 70° C. to obtain purple solid matter. Next, 497 mg (1.01 mmol) of the obtained purple solid matter is put into a 30 mL flask, is suspended in 7 mL of about 10% tetrabutylammonium hydroxide aqueous solution, and is stirred at 60° C. for 30 minutes. Next, the crude product is washed with distilled water, is separated by filtration, and is dried in a vacuum at 60° C. to obtain blue solid matter. Next, 200 mg (0.273 mmol) of the obtained blue solid matter and 67 mg (0.273 mmol) of chloranil are put into a 30 mL flask in an argon atmosphere, and 10 mL of dimethoxyethane (DME) is eluted. Next, the solution is stirred at room temperature for 20 minutes, and the solvent is removed therefrom in a vacuum under reduced pressure. Finally, the crude product is suspended in 80 mL of chloroform and is provided for column chromatography. As a result, 2,6,10-tri-t-butyl-4,8-dioxo-4H,8H-dibenzo[cd,mn]pyrene-12-oxyl can be obtained (brown solid matter).

B. Sodium Ion Battery

FIG. 2 is a schematic cross-sectional view showing an example of the sodium ion battery according to the embodiment of the invention. A sodium ion battery 10 shown in FIG. 2 includes: a positive electrode active material layer 1; a negative electrode active material layer 2; an electrolyte layer 3 that is formed between the positive electrode active material layer 1 and the negative electrode active material layer 2; a positive electrode current collector 4 that collects the current of the positive electrode active material layer 1; a negative electrode current collector 5 that collects the current of the negative electrode active material layer 2; and a battery case 6 that accommodates these members.

According to the embodiment of the invention, by using the active material for a sodium ion battery, the sodium ion battery can be driven, and the capacity thereof can be improved. Hereinafter, each configuration of the sodium ion battery according to the embodiment of the invention will be described.

1. Negative Electrode Active Material Layer

The negative electrode active material layer according to the embodiment of the invention contains at least the negative electrode active material. In addition to the negative electrode active material, the negative electrode active material layer may further contain at least one of a conductive material, a binder, and solid electrolyte material.

In the embodiment of the invention, it is preferable that the negative electrode active material is the active material for a sodium ion battery described above in "A. Active Material for Sodium Ion Battery" because the sodium ion battery can be driven and the capacity thereof can be improved. On the other hand, in the embodiment, the above-described active material for a sodium ion battery may be used as the positive electrode active material, and an active material of the related art may be used as the negative electrode active material. In this case, as the negative electrode active material, an active material having a lower potential than that of the above-described active material for a sodium ion battery is necessarily used. Further, since the above-described active material for a sodium ion battery does not contain Na, it is preferable that the negative electrode active material contains Na. That is, a Na-containing active material such as Na metal or a Na alloy is preferably used as the negative electrode active material.

In addition, the higher the content of the negative electrode active material in the negative electrode active material layer, the better from the viewpoint of capacity. For example, the content of the negative electrode active material is preferably in a range of 60 wt % to 99 wt % and more preferably in a range of 70 wt % to 95 wt %. In addition, the thickness of the negative electrode active material layer largely varies depending on the configuration of a battery, but is, for example, preferably in a range of 0.1 μm to 1000 μm.

2. Positive Electrode Active Material Layer

The positive electrode active material layer according to the embodiment contains at least the positive electrode active material. In addition to the positive electrode active material, the positive electrode active material layer may further contain at least one of a conductive material, a binder, and a solid electrolyte material.

In the embodiment of the invention, it is preferable that the positive electrode active material is an active material having a higher potential than that of the above-described active material for a sodium ion battery because the deposition of Na metal can be suppressed and a battery having high safety can be obtained. Further, since a large amount of the active material having high potential is present, a sodium ion battery having a high voltage can be obtained.

When the above-described active material for a sodium ion battery is used as the negative electrode active material, a commonly-used active material may be used as the positive electrode active material. Examples of the positive electrode active material include a layered active material, a spinel-type active material, and an olivine-type active material. Specific examples of the positive electrode active material include $NaFeO_2$, $NaNiO_2$, $NaCoO_2$, $NaMnO_2$, $NaVO_2$, $Na(Ni_xMn_{1-x})O_2$ ($0<X<1$), $Na(Fe_xMn_{1-x})O_2$ ($0<X<1$), $NaVPO_4F$, $Na_2FePO_4F$, and $Na_3V_2(PO_4)_3$.

A shape of the positive electrode active material is preferably particulate. In addition, the average particle size ($D_{50}$) of the positive electrode active material is, for example, preferably in a range of 1 nm to 100 μm and more preferably in a range of 10 nm to 30 μm. In addition, the higher the content of the positive electrode active material in the positive electrode active material layer, the better from the viewpoint of capacity. For example, the content of the positive electrode active material in the positive electrode active material layer is preferably in a range of 60 wt % to 99 wt % and more preferably in a range of 70 wt % to 95 wt %. In addition, the thickness of the positive electrode active material layer largely varies depending on the configuration of a battery, but is, for example, preferably in a range of 0.1 μm to 1000 μm.

3. Electrolyte Layer

The electrolyte layer according to the embodiment of the invention is a layer that is formed between the positive electrode active material layer and the negative electrode active material layer. Through an electrolyte contained in the electrolyte layer, the positive electrode active material and the negative electrode active material are ionically conductive therebetween. The form of the electrolyte layer is not particularly limited, and examples thereof include a liquid electrolyte layer, a gel electrolyte layer, and a solid electrolyte layer.

Typically, the liquid electrolyte layer is formed using a nonaqueous electrolytic solution. Typically, the nonaqueous electrolytic solution contains a sodium salt and a nonaqueous solvent. Examples of the sodium salt include inorganic sodium salts such as $NaPF_6$, $NaBF_4$, $NaClO_4$, and $NaAsF_6$; and organic sodium salts such as $NaCF_3SO_3$, $NaN(CF_3SO_2)_2$, $NaN(C_2F_5SO_2)_2$, and $NaC(CF_3SO_2)_3$. Examples of the nonaqueous solvent include ethylene carbonate (EC), propylene carbonate (PC), dimethyl carbonate (DMC), diethyl carbonate (DEC), ethyl methyl carbonate (EMC), butylene carbonate (BC), fluoroethylene carbonate (FEC), γ-butyrolactone, sulfolane, acetonitrile, 1,2-dimethoxymethane, 1,3-dimethoxypropane, diethyl ether, tetrahydrofuran, 2-methyltetrahydrofuran, and arbitrary mixtures thereof. A concentration of the sodium salt in the nonaqueous electrolytic solution is, for example, preferably in a range of 0.3 mol/L to 5 mol/L and more preferably in a range of 0.8 mol/L to 1.5 mol/L. When the concentration of the sodium salt is excessively low, the capacity may decrease during high-rate charging and discharging. When the concentration of the sodium salt is excessively high, the viscosity increases, and thus the capacity may decrease at a low temperature. In the embodiment of the invention, as the nonaqueous electrolytic solution, for example, a low volatility liquid such as an ionic liquid may be used as the nonaqueous electrolytic solution.

The gel electrolyte layer can be obtained by adding a polymer to the nonaqueous electrolytic solution to be gelled. Specifically, the gelation can be performed by adding a polymer such as a polyethylene oxide (PEO), polyacrylonitrile (PAN), or polymethyl methacrylate (PMMA) to the nonaqueous electrolytic solution.

The solid electrolyte layer is formed using a solid electrolyte material. In addition, the solid electrolyte material is not particularly limited as long as it has Na ion conductivity, and examples thereof include an oxide solid electrolyte material and a sulfide solid electrolyte material. Examples of the oxide solid electrolyte material include $Na_3Zr_2Si_2PO_{12}$ and β-alumina solid electrolyte (for example, $Na_2O$-$11Al_2O_3$). Examples of the sulfide solid electrolyte material include $Na_2S$—$P_2S_5$.

In addition, the solid electrolyte material according to the embodiment of the invention may be amorphous or crystalline. In addition, a shape of the solid electrolyte material is preferably particulate. In addition, the average particle size ($D_{50}$) of the solid electrolyte material is, for example, preferably in a range of 1 nm to 100 μm and more preferably in a range of 10 nm to 30 μm.

In addition, the thickness of the electrolyte layer largely varies depending on the kind of electrolyte and the configuration of a battery, but is, for example, preferably in a range of 0.1 μm to 1000 μm and more preferably 0.1 μm to 300 μm.

4. Other Configurations

The sodium ion battery according to the embodiment includes at least the negative electrode active material layer, the positive electrode active material layer, and the electrolyte layer described above. Typically, the sodium ion battery further includes the positive electrode current collector that collects the current of the positive electrode active material layer; and the negative electrode current collector that collects the current of the negative electrode active material layer. Examples of a material of the current collector include SUS, aluminum, copper, nickel, iron, titanium, and carbon. The sodium ion battery according to the embodiment of the invention may further include a separator that is formed between the positive electrode active material layer and the negative electrode active material layer. A battery having higher safety can be obtained.

5. Sodium Ion Battery

In addition, the sodium ion battery according to the embodiment of the invention may be a primary battery or a secondary battery. However, the sodium ion battery is preferably a secondary battery because it can be repeatedly charged and discharged and is useful as, for example, a vehicle-mounted battery. In addition, examples of the sodium ion battery according to the embodiment of the invention include a coin type, a laminate type, a cylindrical type, and a square type. In addition, a method of manufacturing the sodium ion battery is not particularly limited, and a common method of manufacturing a sodium ion battery can be adopted.

The invention is not particularly limited to the above-described embodiments. The embodiments are exemplary.

Hereinafter, the invention will be described in more detail using Examples.

EXAMPLE 1, COMPARATIVE EXAMPLES 1 AND 2

(Preparation of Active Material Layer)

An active material ((t-butyl)$_3$-TOT represented by the following Formula (3), Bra-TOT represented by the following Formula (4), or Cl$_3$-TOT represented by the following Formula (5)), acetylene black (AB) as a conductive material, and polyvinylidene fluoride (PVDF) were mixed with each other at a ratio (active material:AB:PVDF) of 10:80:10 (wt %) to form an active material layer on a working electrode side. In addition, an active material layer on a counter electrode side was obtained using Na metal.

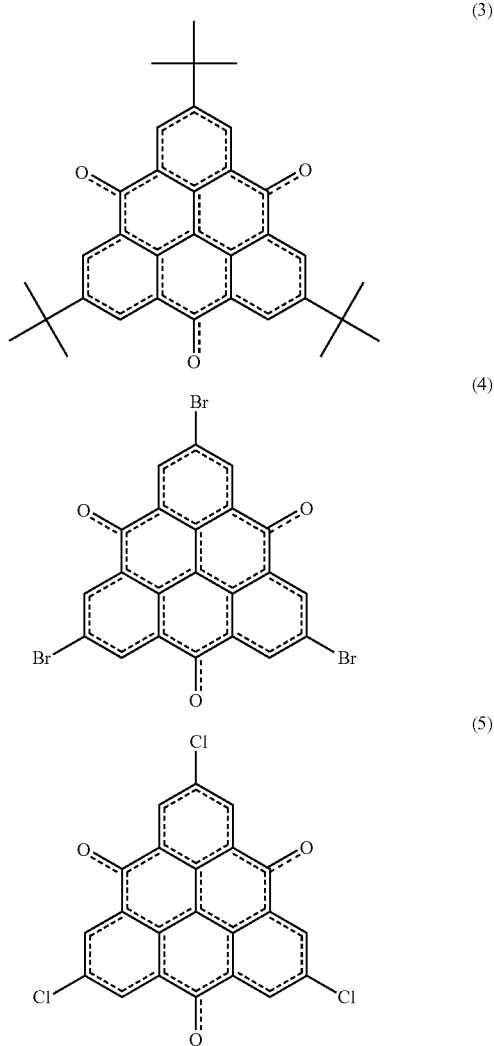

(Preparation of Electrolyte Layer)

Ethylene carbonate (EC) and diethyl carbonate (DEC) were mixed with each other at a ratio (EC:DEC) of 1:1 (vol %), and the mixture was further mixed with 1M NaPF$_6$ to prepare an electrolytic solution.

(Preparation of Evaluation Battery)

A coin type evaluation battery including the above-described active material layers on the working electrode side and the counter electrode side, the electrolytic solution, and a separator was prepared. As the separator, a polyolefin (PE or PP) microporous membrane was used.

EXAMPLE 2, COMPARATIVE EXAMPLES 3 AND 4

Evaluation batteries were prepared by the same procedure as that of Example 1 and Comparative Examples 1 and 2, except propylene carbonate (PC) and fluoroethylene carbonate (FEC) were mixed with each other at a ratio (PC:FEC) of 100:5 (wt %), and the mixture was further mixed with 1M NaPF$_6$ to prepare an electrolytic solution.

EXAMPLE 3, COMPARATIVE EXAMPLES 5 AND 6

Evaluation batteries were prepared by the same procedure as that of Example 1 and Comparative Examples 1 and 2, except that ethylene carbonate (EC) and dimethyl carbonate (DMC) were mixed with each other at a ratio (EC:DMC) of 1:1, and the mixture was further mixed with 1M NaN(CF$_3$SO$_2$)$_2$ to prepare an electrolytic solution.

[Evaluation 1]

Under the following conditions, CV measurement was performed on the evaluation batteries. When the CV measurement was performed at a sweep rate of 0.1 mV/sec and a sweep range of 1.0 V to 3.1 V (vs. Na electrode potential), as shown in FIG. 3, an oxidation-reduction current was observed in a region of 1.0 V to 1.5 V (vs. Na electrode potential) where the active material can be used for a negative electrode and in a region of 2.5 V to 3.1 V (vs. Na electrode potential) where the active material can be used for a positive electrode. As a result, it can be clearly seen that (t-butyl)$_3$-TOT functions as the positive electrode active material and the negative electrode active material for a sodium ion battery. In addition, from the CV measurement results shown in FIG. 3, the following points can be seen: the reaction current in the region of 1.0 V to 1.5 V (vs. Na electrode potential) is higher than that in the region of 2.5 V to 3.1 V (vs. Na electrode potential); a difference between an oxidation current peak potential and a reduction current peak potential in the region of 1.0 V to 1.5 V is less than that in the region of 2.5 V to 3.1 V; and therefore, the reaction rate in the region of 1.0 V to 1.5 V is higher than that in the region of 2.5 V to 3.1 V. As a result, it can be clearly seen that the aptitude of (t-butyl)$_3$-TOT as a negative electrode active material is higher than the aptitude thereof as a positive electrode active material.

[Evaluation 2]

(Evaluation of Capacity)

Under the following conditions, the evaluation batteries were driven. The capacity was measured under conditions including a charging condition of CC4V1C (220 mAh/g=1 C), a discharging condition of CC1V1C (220 mAh/g=1 C), and a temperature of 25° C. As a result, it can be clearly seen that (t-butyl)$_3$-TOT functions as the positive electrode active material and the negative electrode active material for a sodium ion battery. As shown in Table 1, in Examples 1 to 3, the capacity was improved by approximately two times as compared to Comparative Examples 1 to 6. When Examples 1 to 3 and Comparative Examples 1 to 6 were compared to each other, it was found that the above-described effects were significant in Examples 1 to 3 in which the active material for a sodium ion battery according to the invention was used as the negative electrode active material.

|  | Active Material Layer | | | Capacity (mAh/g) | |
| --- | --- | --- | --- | --- | --- |
|  | Working Electrode Side | Counter Electrode Side | Electrolytic Solution | When Used as Positive Electrode | When Used as Negative Electrode |
| Example 1 | (t-butyl)$_3$-TOT | Na Metal | EC + DEC, 1M NaPF$_6$ | 62 | 71 |
| Comparative Example 1 | Br$_3$-TOT |  |  | 35 | 28 |
| Comparative Example 2 | Cl$_3$-TOT |  |  | 32 | 25 |
| Example 2 | (t-butyl)$_3$-TOT |  | PC + FEC, 1M NaPF$_6$ | 64 | 73 |
| Comparative Example 3 | Br$_3$-TOT |  |  | 37 | 29 |
| Comparative Example 4 | Cl$_3$-TOT |  |  | 33 | 26 |
| Example 3 | (t-butyl)$_3$-TOT |  | EC + DMC, 1M NaN(CF$_3$SO$_2$)$_2$ | 59 | 66 |
| Comparative Example 5 | Br$_3$-TOT |  |  | 34 | 26 |
| Comparative Example 6 | Cl$_3$-TOT |  |  | 28 | 23 |

When the batteries of Examples 1 to 3 and Comparative Examples 1 to 6 were used as a positive electrode, the capacity was equal to the capacity of the storing reaction of sodium ions in a region of 2 V or higher (vs. Na metal electrode potential). In addition, when the batteries of Examples 1 to 3 and Comparative Examples 1 to 6 were used as a negative electrode, the capacity was equal to the capacity of the releasing reaction of sodium ions in a region of 2 V or lower (vs. Na metal electrode potential).

What is claimed is:

1. An active material for a sodium ion battery comprising: (t-butyl)$_3$-trioxotriangulene represented by the following Formula (1),

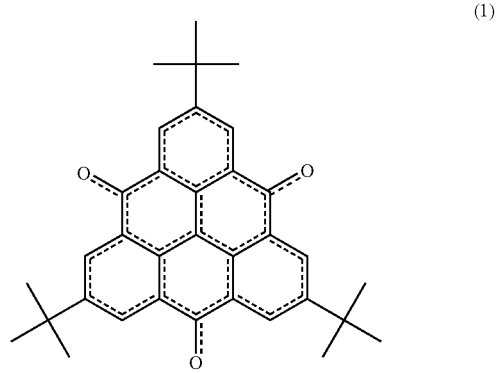

(1)

wherein in Formula (1), a double line including a solid line and a broken line represents a single bond or a double bond, wherein the active material is a negative electrode active material for the sodium ion battery.

2. A sodium ion battery comprising:

a positive electrode active material layer containing a positive electrode active material;

a negative electrode active material layer containing a negative electrode active material; and an electrolyte layer formed between the positive electrode active material layer and the negative electrode active material layer, wherein the positive electrode active material or the negative electrode active material is the active material for the sodium ion battery according to claim 1.

3. The sodium ion battery according to claim 2, wherein the negative electrode active material is the active material for the sodium ion battery.

\* \* \* \* \*